United States Patent
Mezheritsky et al.

(10) Patent No.: US 7,216,607 B2
(45) Date of Patent: May 15, 2007

(54) EMISSION CONTROL WATER INJECTION SYSTEM FOR DIESEL ENGINES

(75) Inventors: Anatoly Mezheritsky, Vancouver (CA); Andrey Levin, Richmond (CA); Yukhum Petrov, Burnaby (CA)

(73) Assignee: Rival Technologies Inc., West Vancouver, British Columbia (CA)

( * ) Notice: Subject to any disclaimer, the term of this patent is extended or adjusted under 35 U.S.C. 154(b) by 0 days.

(21) Appl. No.: 10/908,855

(22) Filed: May 27, 2005

(65) Prior Publication Data

US 2006/0266307 A1 Nov. 30, 2006

(51) Int. Cl.
*F02B 1/12* (2006.01)
*F02B 23/00* (2006.01)
*F02B 47/02* (2006.01)
*F02M 17/30* (2006.01)

(52) U.S. Cl. ............... 123/25 C; 123/27 R; 123/585; 123/198 D; 123/25 J

(58) Field of Classification Search ............... 123/25 J, 123/25 K, 25 L, 25 M, 25 N, 25 A, 25 P, 123/25 C, 27 R, 585, 198 D
See application file for complete search history.

(56) References Cited

U.S. PATENT DOCUMENTS

| | | | |
|---|---|---|---|
| 3,911,871 A * | 10/1975 | Williams et al. | 123/25 K |
| 4,096,829 A | 6/1978 | Spears | |
| 4,191,134 A | 3/1980 | Goodman | |
| 4,240,380 A | 12/1980 | Slagle | |
| 4,279,223 A | 7/1981 | Csonka et al. | |
| 4,300,483 A | 11/1981 | Goodman | |
| 4,300,484 A | 11/1981 | Goodman | |
| 4,300,485 A | 11/1981 | Goodman | |
| 4,311,118 A | 1/1982 | Slagle | |
| 4,351,289 A | 9/1982 | Renda | |
| 4,364,370 A | 12/1982 | Smith et al. | |
| 4,406,255 A | 9/1983 | Goodman | |
| 4,424,676 A | 1/1984 | Meiners | |
| 4,440,116 A | 4/1984 | Stevenson et al. | |
| 4,441,476 A | 4/1984 | Roberts et al. | |
| 4,448,153 A | 5/1984 | Miller | |
| 4,448,179 A | 5/1984 | Foster | |

(Continued)

FOREIGN PATENT DOCUMENTS

JP 58-057025 4/1983

(Continued)

OTHER PUBLICATIONS

Anatoly Mezheritsky, "Continuous Water Injection", Innovation, Nov. 2000, pp. 12-15.

*Primary Examiner*—Stephen K. Cronin
*Assistant Examiner*—Hyder Ali
(74) *Attorney, Agent, or Firm*—Paul Smith Intellectual Property Law; Paul Smith

(57) ABSTRACT

A water injection system (WIS) for diesel engines that reduces NOx, PM and $CO_2$ emissions is provided. Water is injected into the combustion air stream before cylinders in a predetermined proportion to fuel. The present invention utilizes a special water purification element, an oscillating pump, an electronic means to control both water flow and the size of water droplets, a means to prevent water from freezing in cold ambient temperatures, a plurality of special sensors to control water flow in response to rapid load variation, and a means for automatically switching between on and off operations.

22 Claims, 6 Drawing Sheets

U.S. PATENT DOCUMENTS

| | | |
|---|---|---|
| 4,459,943 A | 7/1984 | Goodman |
| 4,461,245 A | 7/1984 | Vinokur |
| 4,502,420 A | 3/1985 | Mezger |
| 4,558,665 A | 12/1985 | Sandberg et al. |
| 4,630,642 A | 12/1986 | Detweiler |
| 4,676,204 A | 6/1987 | Inoguchi et al. |
| 4,800,848 A | 1/1989 | Hubbard |
| 4,960,080 A | 10/1990 | O'Neill et al. |
| 5,125,377 A * | 6/1992 | Mezheritsky ........... 123/198 A |
| 5,148,776 A | 9/1992 | Connor |
| 5,174,247 A | 12/1992 | Tosa et al. |
| 5,199,386 A | 4/1993 | Hubbard |
| 5,522,349 A | 6/1996 | Yoshihara et al. |
| 5,904,121 A * | 5/1999 | Mezheritsky et al. ..... 123/25 C |
| 6,082,311 A | 7/2000 | Collin |
| 6,112,705 A * | 9/2000 | Nakayama et al. ....... 123/25 C |
| 6,289,853 B1 | 9/2001 | Walczak et al. |
| 6,357,671 B1 | 3/2002 | Cewers |
| 6,637,382 B1 | 10/2003 | Brehob et al. |
| 6,698,387 B1 | 3/2004 | McFarland et al. |

FOREIGN PATENT DOCUMENTS

| | | |
|---|---|---|
| JP | 60-054761 | 3/1985 |
| JP | 60-172377 | 9/1985 |
| KR | 2003050456 | 6/2003 |

* cited by examiner

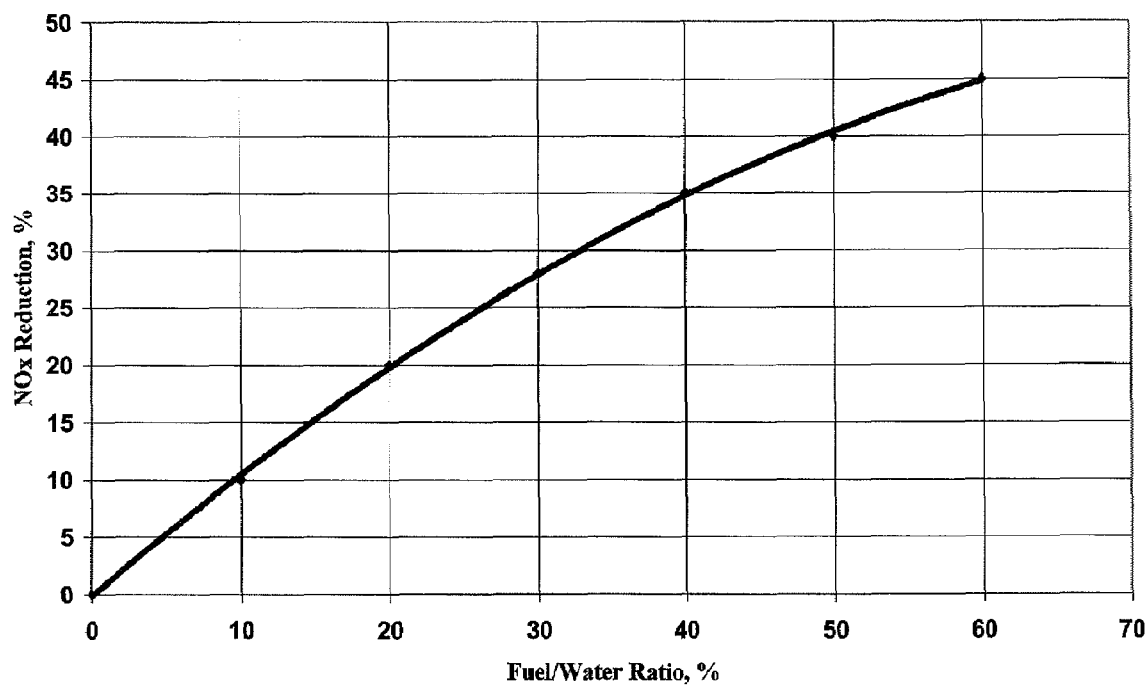
Fig.2. Theoretical Effect of Water Injection on NOx Formation

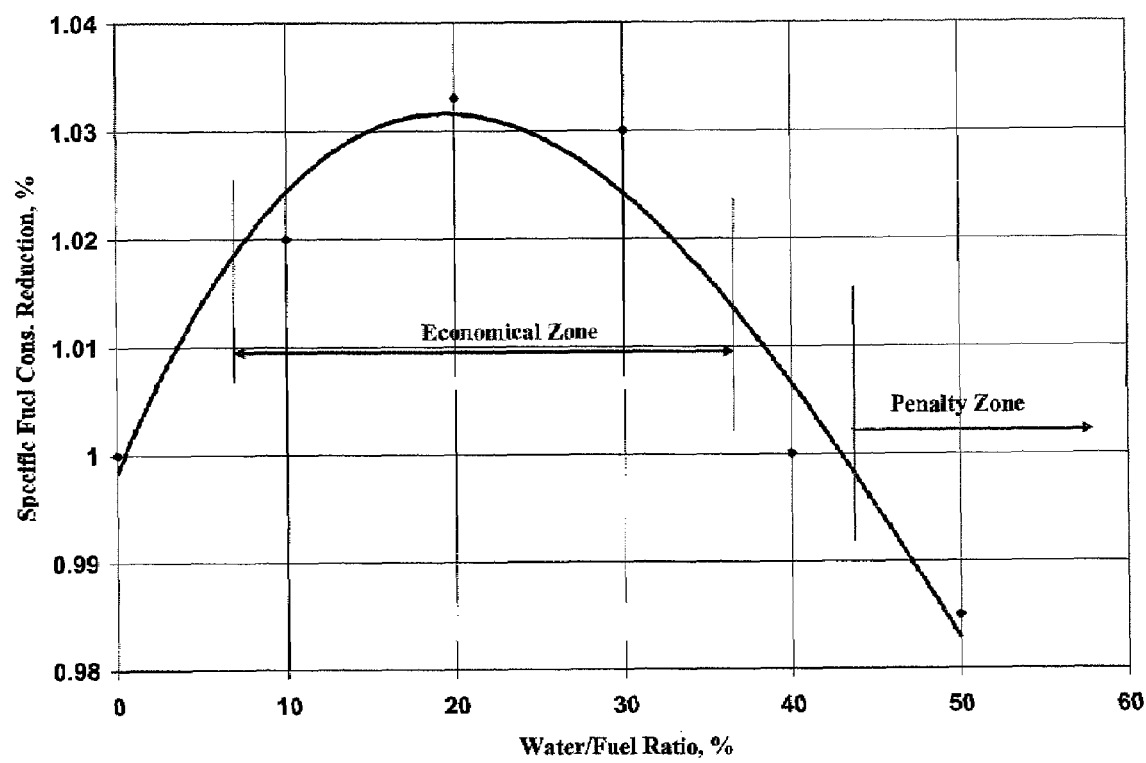
Fig.3 Theoretical effect of Water/Fuel Ratio on Specific Fuel Consumption

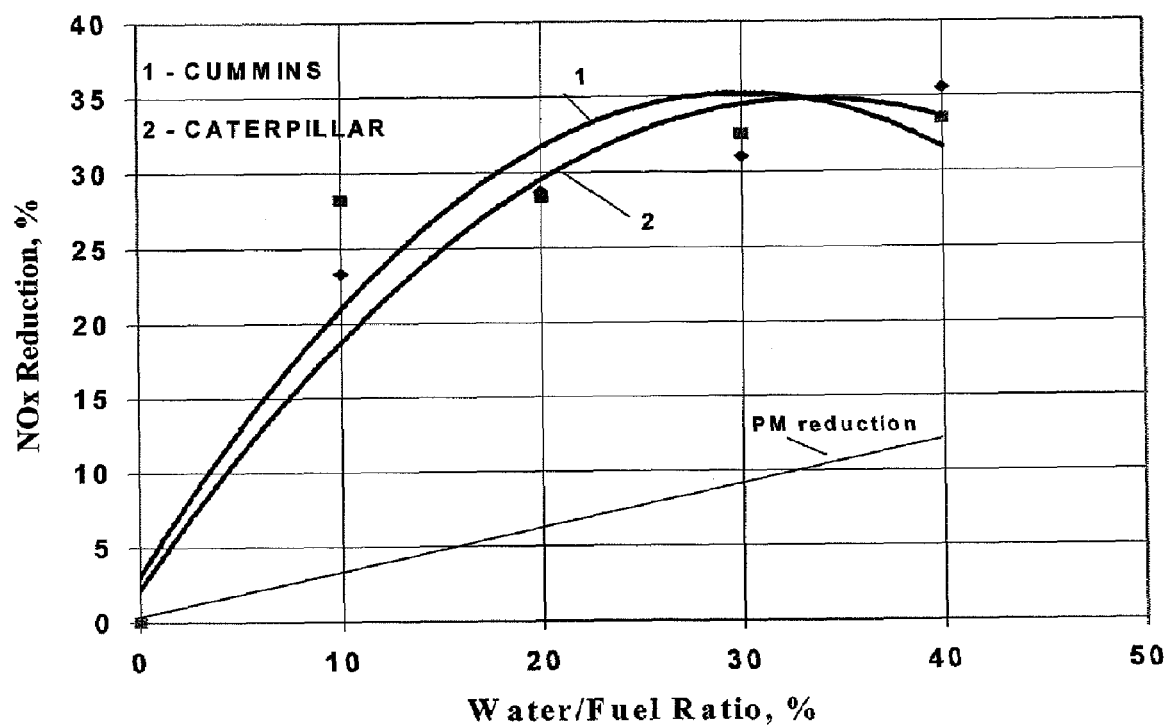
FIG. 4a. INFLUENCE OF WATER INJECTION ON NOx EMISSION

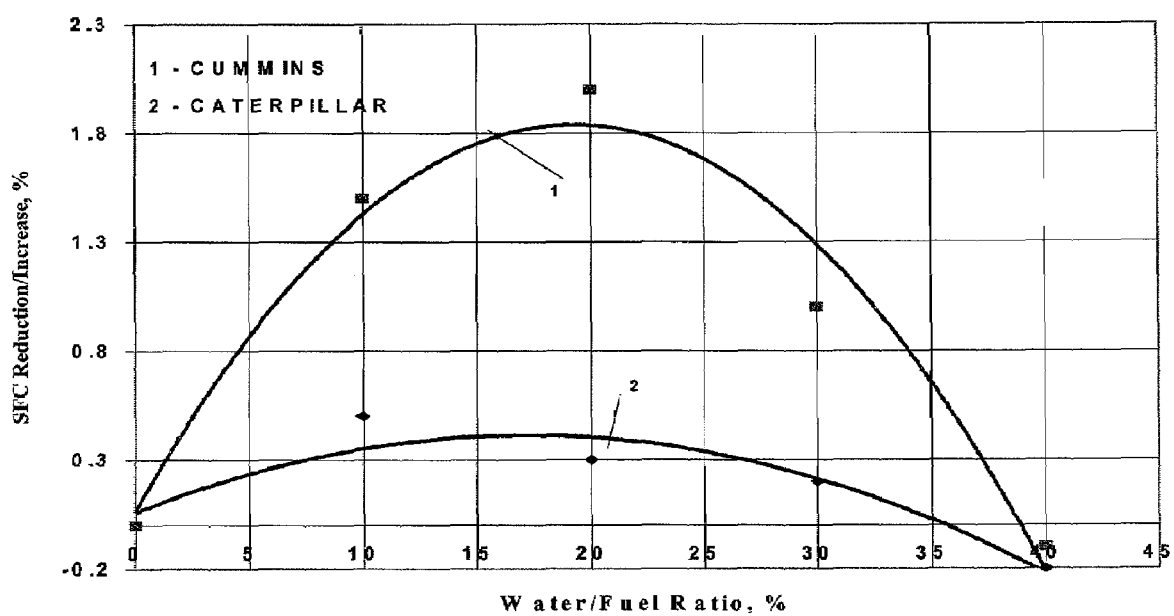
FIG. 4b. INFLUENCE OF WATER INJECTION ON SPECIFIC FUEL CONSUMPTION

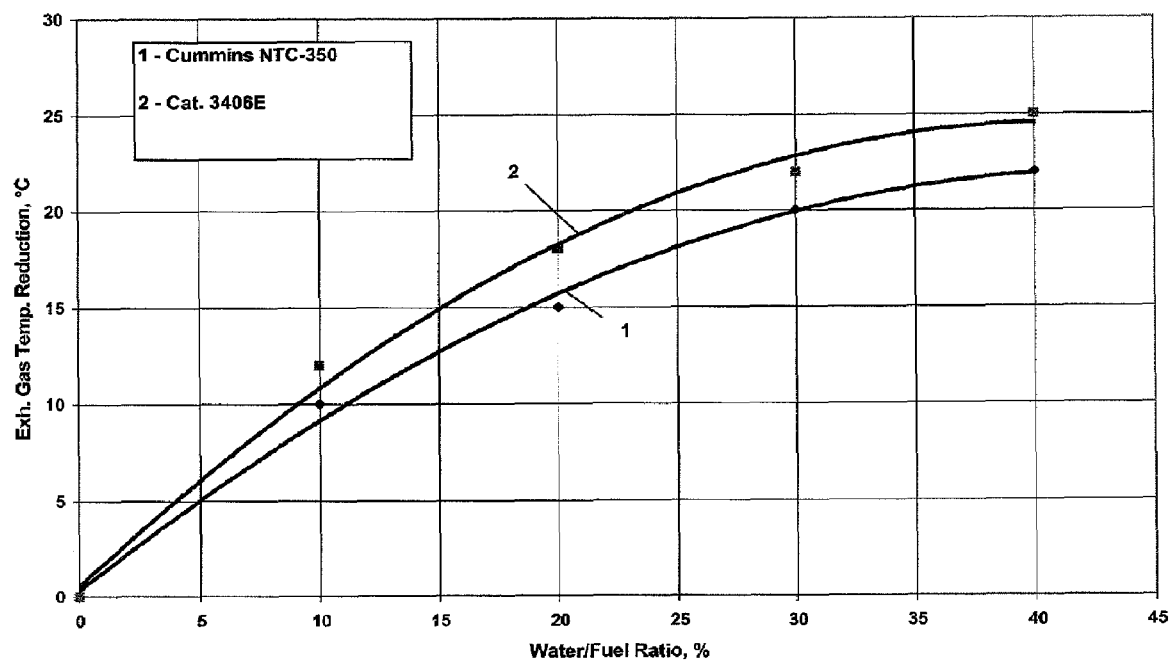
Fig. 4c. INFLUENCE OF WATER INJECTION ON EXHAUST GAS TEMPERATURE

EMISSION CONTROL WATER INJECTION SYSTEM FOR DIESEL ENGINES

FIELD OF THE INVENTION

The present invention relates to diesel engines. In particular, the present invention relates to diesel engines installed on transportation vehicles and on off-road, highly manoeuvrable, machines with limited space for installation, such as bases, cranes, and port loading/unloading equipment. These diesel engines typically operate under frequent rapid load variations, under different climate conditions and with limited purified water access.

BACKGROUND OF THE INVENTION

The harmful combustion products produced by a conventional diesel engine include nitrogen oxides (NOx), carbon monoxide (CO), and various hydrocarbons formed from the incomplete combustion of the diesel fuel. Other gaseous emissions include oxides of sulfur, generally referred to as SOx. Also, solid carbon particles are produced which enter the exhaust in the form of soot or ash, also known as particulate matter (or PM).

Oxides of nitrogen (NO and $NO_2$) are a considerable component of diesel engines emissions. These oxides of nitrogen (referred to collectively as NOx) are known to be poisonous to the environment and dangerous to human health. Once dispersed into the atmosphere, NOx decomposes and contributes to air pollution and acid rain.

It is desirable to reduce the harmful emissions from diesel engines, particularly NOx emissions. Previous attempts to reduce NOx emissions have typically resulted in tradeoffs such as an increase in the other harmful emissions produced by the diesel engines or increased fuel consumption. It is therefore an object of the present invention to reduce harmful emissions, particularly of NOx, without such emission tradeoffs and increased fuel consumption.

DESCRIPTION OF THE PRIOR ART

Numerous studies have been conducted on using diesel oil/water emulsified fuels and direct water injection (DWI) into cylinders. For example, diesel engine manufacturers Daimler-Benz, Wartsila, and Mitsubishi have found that a stratified diesel/water/diesel injection system may cut both NOx and PM emissions below IMO/EPA emissions standards. It is known that supplying water to the intake air stream of diesel engines reduces the level of NOx and PM emissions in exhaust.

Therefore, water technology is considered to be an important technology for NOx emission control. The following patents disclose practical means to facilitate and control effective water injection into the intake air stream of internal combustion engines for different applications.

The water injection systems disclosed in U.S. Pat. Nos. 4,096,829, 4,311,118, 4,191,134, 4,364,370, 4,424,676, 4,440,116, 4,448,153, 6,637,382, Japanese Patent No. 58057025, and South Korea Patent No. 2003050456 all rely on the use of mechanical atomizing nozzles to atomize injected water into the air stream. Different control means, such as through control valves or variable output water pumps are employed to facilitate a variable water supply to the mechanical atomizing nozzles. Unfortunately, mechanical atomizing nozzles rely solely on high water pressure to produce a highly atomized water spray and have a severely restricted turn down ratio (i.e. the ratio between the maximum and minimum water flow rates). The problem of insufficient atomization of injected water at low water delivery rates (and consequently low effective injection pressure) is not addressed. It is known that the water flow rate through a mechanical atomizing nozzle orifice is proportional to the square root of water pressure. Therefore, to increase water flow four times one has to increase water pressure from an initial 60 psi to as high as 960 psi. As a consequence, the controlling of the water injection rate by modulating pressure in a water supply line is not practical for engines with frequent and rapid load changes.

U.S. Pat. Nos. 4,096,829, 4,240,380, 4,300,483, 4,351,289, 4,448,153, 4,448,179, 4,800,848, and 5,199,386 disclose different schemes of introducing water into intake air by supplying a controlled amount of water to a carburetor. Water atomization in these applications relies solely on the suction effect of the air stream in venturi narrow. These technologies are generally applicable only to naturally aspirated gasoline engines and are presently obsolete given the universal shift from carburetors to electronic fuel injection in modern gasoline engines. Furthermore, the technology is not applicable to diesel engines, especially ones that are turbocharged or supercharged.

U.S. Pat. No. 4,461,245 uses a pressure modulated, variable geometry spray nozzle to facilitate water atomization over a wide range of water injection pressures. However, a variable geometry nozzle adjusts only the dimension of the outlet orifice and does not adjust the geometry of the internal channels that induce water swirl motions. As a consequence, the quality of the spray is unsatisfactory at marginal flow rates. Also, the system does not provide a means for rapid reaction in response to engine acceleration or deceleration.

The systems disclosed in U.S. Pat. Nos. 6,082,311, 4,459,943, 4,406,255, 4,300,485, 4,300,484, and 4,300,483 rely on water atomization using a stream of compressed air. These systems allow for good atomization with a high turn down ratio, but they also require the installation of a separate compressed air system, which makes the entire system complicated, bulky, and expensive to manufacture, install, and operate.

U.S. Pat. No. 4,441,476 proposes the use of compressed air from the air brake system of heavy-duty vehicles to facilitate water atomization. However, the involvement of the air brake system may lead to safety concerns from transportation regulators. Furthermore, the system is limited to vehicles equipped with air brakes.

U.S. Pat. Nos. 4,558,665, 4,502,420, and 5,148,776 adapt the conventional gasoline fuel injection system of modern passenger and light-duty vehicles to provide for the injection of water into engines. These systems rely on a high-pressure water supply loop to a solenoid-operated injection nozzle, which is typically a solenoid needle valve. Computer modulation, through electrical signals, of the frequency and pulse width is employed. However, a solenoid needle valve is unable to facilitate good water atomization, as compared to a specialized mechanical atomizing nozzle. These systems are also complicated due to the use of a closed loop of water circulation with pressure regulator. A high-pressure pump must be run at full power continuously when water injection is active, regardless of the actual water injection rate. This consumes energy and wears out the system quickly. In addition, a constantly running pump may lead to the flooding of the engine if the solenoid injector is stuck in the open position, which could result in irreversible damage to the engine during starting. Problems with protection against freezing and water purification are not addressed.

U.S. Pat. Nos. 6,082,311 and 4,630,642 disclose various systems to inject water into intake air before a turbocharger's air compressor. These systems are analogous to compressor water washing systems found in marine engines. They incorporate a small water tank (of between one and three litres in capacity), a pressure air supply line connected to a scavenging manifold, and a water supply line that directs water from the water tank to the compressor air suction duct. In washing systems, a small amount of water is injected (for 15 to 20 seconds) each day into the compressor to remove deposits from the blades. However, in U.S. Pat. Nos. 6,082,311 and 4,630,642, a relatively large flow of water is continuously injected into a compressor. This violates turbomachinery fundamentals because an air compressor cannot work as a water pump. It is known that NOx reduction is approximately proportional to water flow. Under such conditions, any air centrifugal compressor will likely surge and be destroyed by the large, constant flow of water.

U.S. Pat. No. 4,960,080 discloses a water injection system optimized to reduce NOx generation in a diesel engine. Both distilled water and filtered water are injected into the air intake after a compressor's turbocharger. The engine switches on water injection when the electrical output from the diesel engine exceeds a predetermined level, associated with a threshold level of NOx in exhaust gases. This system is very limited in scope, as it only operates at constant water flow for a particular engine running at constant engine rotational speed. There is no optimization of the amount of injected water for different engine loads.

Numerous recent patents describe direct water injection systems for marine engines. These patents are based on direct water injection into the combustion chambers of diesel engines. For example, U.S. Pat. No. 5,522,349 sets forth a water injection system that meters a spray of water into each cylinder, timed synchronously with fuel injectors to achieve a spray pattern that should be optimal in the abatement of NOx emissions. Water is injected under the same pressure as the fuel. These direct water injection systems require significant alterations to the engine's head and are quite complicated and expensive. Moreover, direct water injection leads to severe fuel consumption penalties. The main disadvantage of direct water injection is that water is delivered under high pressure directly to cylinder walls, affecting the lubricating oil film.

U.S. Pat. Nos. 6,357,671 and 6,698,387 propose the use of ultrasonic piezoelectric atomizing nozzles to facilitate water injection into the air intake of internal combustion engines. Japanese Patent Nos. 60054761 and 60172377 also make use of ultrasonic piezoelectric oscillators to facilitate liquid atomization. Ultrasonic atomization assures superb atomization, a good turn down ratio, and relative ease in governing of amount of water supplied. However, current ultrasonic injectors cannot provide the water flow required for effective emissions control. Moreover, ultrasonic devices cannot effectively work under different ambient conditions; they must be thermostabilized. Finally, ultrasonic injectors are very expensive.

U.S. Pat. No. 6,698,387 discloses a method of hydrating the intake air of turbocharged engine with cool purified water. The signal for system activation is based on the exhaust gas temperature. It is well known that this temperature does not precisely follow engine load, as there is a temperature lag. Therefore, for engines undergoing rapid acceleration/deceleration, such water flow control is inefficient.

Therefore, the implementation of any water injection system for diesel engines installed on machines such as automotives, bases, port loading equipment, and cranes, depends on the system's ability to satisfy the following requirements:
(1) Relatively small dimensions, with all components capable of being easily located under a hood or inside a vehicle's body;
(2) The ability to react immediately in response to rapidly varying engine loads;
(3) The capability of using regular potable water;
(4) The capability of operating under different ambient conditions (e.g. from −30° C. to +40° C.); and
(5) The ability to remain completely operational even if the water injection system fails.

SUMMARY OF THE INVENTION

In one embodiment of the present invention, a water injection system for reducing harmful exhaust emissions from a diesel engine includes one or more mechanical atomizing nozzles configured to inject water into the compressed air produced by an air compressor, such as a turbocharger on a diesel engine; an oscillating pump to control water flow and the degree of water atomization; a water deionization subsystem; a means to prevent water freezing; and an electronic block to provide fast response to rapid engine acceleration and deceleration. Water injected into the compressed air evaporates and the humidified air enters the diesel engine's combustion chambers. The humidified air lowers the combustion temperature of the engine and reduces harmful exhaust emissions, particularly NOx and PM emissions.

The oscillating pump reacts practically immediately to any engine load variation and can adjust the water flow to an engine in a matter of milliseconds.

Preferably, a small dimensional water particulate filter and deionizer are provided to allow for the use of low-quality water.

Preferably, a water tank is equipped with an automatically operated electrical heater, hence preventing the water from freezing.

The injected water does not interfere with the fuel supply system, the existing engine control system, the brakes, the transmission, or any other vehicle subsystem. Therefore, if the water supply fails, there is no effect on engine operation availability.

BRIEF DESCRIPTION OF THE DRAWINGS

The accompanying drawings illustrate an embodiment of the invention and, together with the description, serve to explain the principles of the invention.

FIG. 2 is a graph illustrating the theoretical relationship between the reduction of NOx emissions and the water/fuel ratio (WFR), or the amount of water injected compared to amount of burned fuel.

FIG. 3 is a graph illustrating the theoretical relationship between the fuel economy of a diesel engine and the water/fuel ratio.

FIGS. 4a, 4b, and 4c are graphs illustrating the experimental results of tests conducted on the water injection system according to the present invention.

DETAILED DESCRIPTION OF THE INVENTION

Figure 1:
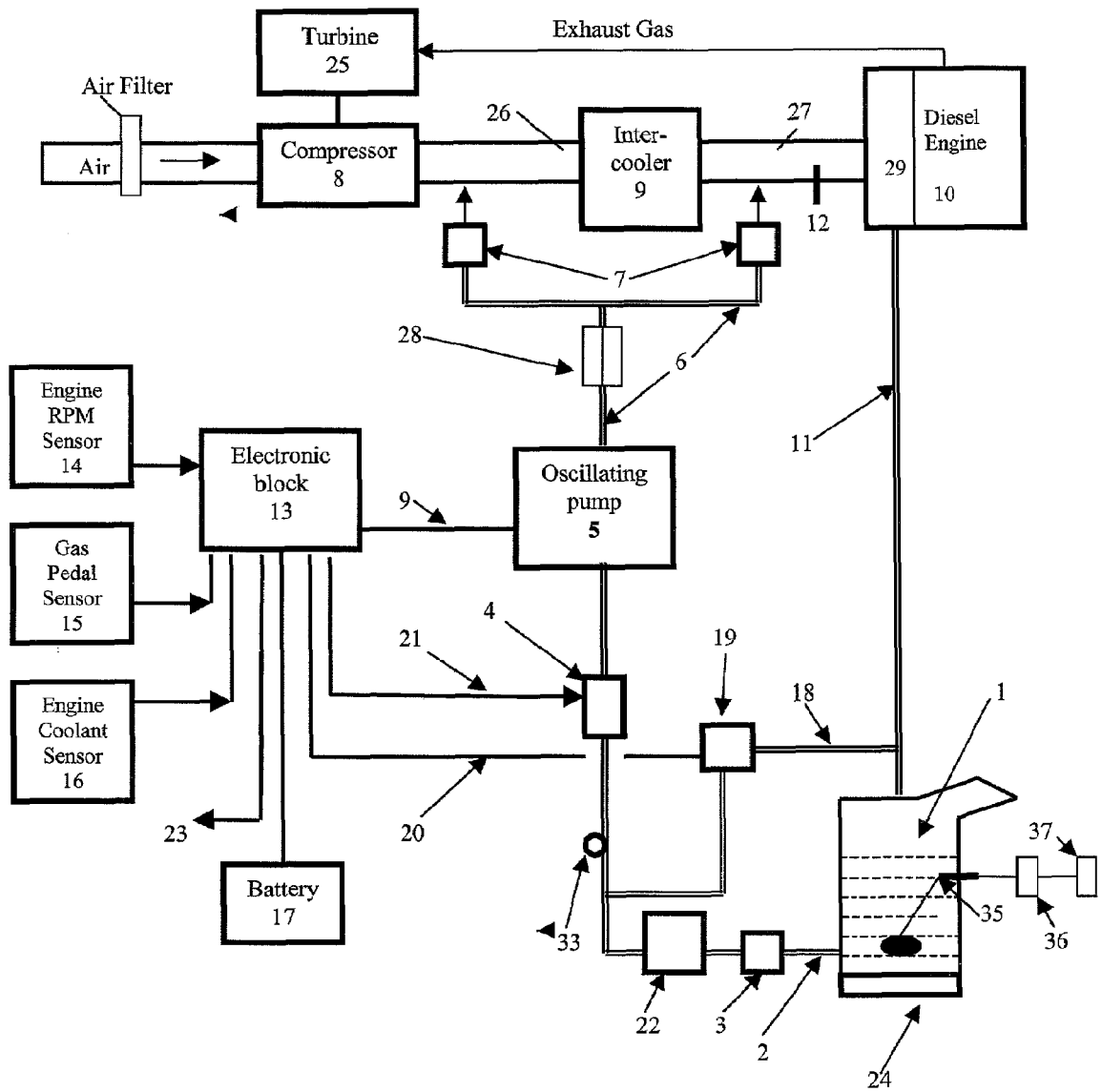
FIG. 1 is a schematic diagram of the preferred embodiment of a water injection system according to the invention.

Turning now in detail to the drawings, FIG. 1 shows an embodiment of a water injection system designed to reduce harmful emissions from a diesel engine 10. The diesel engine may be any typical diesel engine. In the preferred embodiment, the diesel engine 10 is a Cummings 5.9-litre, 170 hp, 24-valve, in-line six diesel engine, powering a Dodge Ram 2500 pick-up truck. This diesel engine is widely used both for on- and off-road applications, and is representative of most diesel engines of this class.

Diesel engine 10 is a standard diesel engine having a compressed air source 8 for providing compressed air to the combustion chamber of diesel engine 10. Preferably, the compressed air source 8 will be a turbocharger or a supercharger. In the illustrated embodiment, the compressed air source 8 is a turbocharger compressor driven by a turbocharger turbine 25 that is driven by the hot exhaust gases from the diesel engine 10.

Once the compressed air has left the compressed air source 8, the compressed air flows through a first compressed air duct 26 to an air intercooler 9. Air intercooler 9 reduces the temperature of the compressed air before it enters the diesel engine 10. The compressed air then flows through a second compressed air duct 27 to the air intake or scavenging manifold 29 on the diesel engine 10. From there, the compressed air enters the combustion chamber of diesel engine 10.

As shown in FIG. 1, the present invention comprises one or more mechanical atomizing nozzles 7, which are configured to inject water into the compressed air leaving the compressed air source 8, either before or after or both before and after the air intercooler 9. Due to the high temperature of the compressed air in the first compressed air duct 26, most of the water injected before the air intercooler 9 evaporates instantly. Additional water may be injected into the second compressed air duct 27 after intercooler 9, and it partially evaporates. This lowers the temperature of the compressed air and ultimately reduces the combustion temperature of the diesel engine 10. The reduction in the combustion temperature of the diesel engine 10 results in a reduction in NOx emissions. Also, the presence of water vapour in the combustion chamber improves the combustion of fuel, thus reducing the generation of diesel soot (PM) emissions.

Atomizing nozzles 7 are preferably oriented to inject a fine mist of water droplets in a direction approximately opposite to the direction of flow of the compressed air from the compressed air source 8. This improves the turbulent mixing and evaporation of the injected water in the compressed air. In the preferred embodiment, the atomizing nozzles 7 are Spraying System Co.® mechanical (also referred to as hydraulic) atomizing nozzles, type LNN-W, produced by the Spray Engineering division of John Brooks Company Limited, Ontario, Canada. These nozzles incorporate angled water passages inside the nozzle body to induce a high-speed tangential swirl motion. The water is atomized to droplets of less than 30 micron diameter. The atomizing nozzles 7 incorporate an integral strainer to prevent orifice clogging and a non-return valve with a weak spring to prevent water dripping from the nozzle tip when the water injection system is off.

As shown in FIG. 1, water from a water source 1 is delivered by a flexible pipe 2 through a fine mesh particulate filter 3 and an ion exchange deionizer cartridge 22. Preferably, the water source 1 is a tank. The water then passes through a water conductivity meter 33 to a water flow meter 4 and then to an oscillating pump 5. The water source 1 is also connected by a flexible hose 11 to the air intake manifold 29 of the diesel engine 10. The flexible pipe 2 and the flexible hose 11 are preferably made from flexible materials such as reinforced rubber in order to absorb undesirable vibrations.

The water to be injected by the atomizing nozzles 7 is supplied and pressurized by the oscillating pump 5. A standard oscillating pump (or oscillating solenoid pump) generally comprises a cylindrical piston made from a soft magnetic material that is movably suspended by means of retention and return springs in a non-magnetic cylinder. A solenoid with cylindrical magnetic cores is placed around the cylinder. Pulses of electricity supplied to the solenoid induce a magnetic field in the solenoid cores, which magnetically attracts the piston and causes it to compress water in the cylinder. The piston is returned to its initial position by a return spring when the electricity pulse to the solenoid is turned off. The reciprocating motion of the piston induces high-pressure water flow in the cylinder. A plurality of non-return valves and water passages facilitate water flow in only one direction along the cylinder. The amount of displaced water during one piston's stroke depends directly on how long the electric pulse (known as the "pulse width") to the solenoid is maintained. The repetition rate of the electrical pulses (known as the "frequency") multiplied by amount of water pumped during one pulse determines how much water (in total) is pumped. By alternating both the pulse width and the frequency of the driving signals, differing amounts of water can be pumped through the system.

Commercially available oscillating pumps are light, small, inexpensive, reliable, and energy-efficient. In the preferred embodiment, a Fluid-o-Tech Corporation "Mono" oscillating pump is used, which consumes 45 W of 24 volts AC, can deliver a water flow of up to 20 litres/h, and weights less than 0.3 kg. The oscillating pump 5 can perform compression strokes with a frequency of up to 80 times per second for approximately one third of the oscillating time period. This translates into an extremely high—up to 25 bar or 350 psi—peak pressure for a very short period of time, followed by zero pressure periods when there is no water injection. By varying the time length of compression strokes and their frequency (pulses per minute), it is possible to produce a wide range of water injection rates, while assuring that all injected water during the compression stroke is finely atomized. These high frequency pressure waves assure superb atomization at the nozzle tip of atomizing nozzles 7. The oscillating pump 5 is capable of an extremely short response time in adjusting the amount of water injected—practically hundredths of a second. There are energy savings when the diesel engine 10 is at partial load or idling because the electricity consumption of the oscillating pump 5 is proportional to the amount of injected water. An additional benefit of this is the increased lifespan of the pump. To take full advantage of the pulsating pressure produced by the oscillating pump 5, a plurality of high-pressure pipes 6 are used to deliver pressurized water from the oscillating pump 5 to the atomizing nozzles 7. The high-pressure pipes 6 should preferably be rigid and as short as possible. Stainless steel piping is preferable.

Since oscillating pumps have limited priming abilities, when the system is not primed with water and the oscillating pump 5 has to work against elevated pressure in the air intake manifold 29, pump priming could fail. Consequently, the flexible hose 11 connects the air intake manifold 29 of diesel engine 10 to the water source 1 so that the air pressure in the water 1 is equal to the air pressure in the air intake manifold 29. This results in the water pressure entering the oscillating pump 5 and the pressure of the compressed air working against water injected from atomizing nozzles 7 being equalized. Therefore, the oscillating pump 5 can easily start the water injection operation.

The relationship between the reduction in NOx emissions and the amount of water injected is shown in FIG. 2. NOx reduction is proportional to the water/fuel ratio (WFR). On the other hand, the injection of water into the compressed air affects the efficiency of the engine. Generally, as the amount of water injected into the compressed air increases, the engine efficiency (e.g. miles per gallon) improves. However, once a maximum improvement is reached, engine efficiency diminishes as more water is injected. The relationship between engine efficiency and the amount of water injected is shown in FIG. 3. Testing of water injection systems has shown that fuel economy can be optimized and an approximately 30%–35% reduction in NOx emissions can be obtained simultaneously when the WFR is about between 0.30–0.35 (30%–35%). Therefore, it is desirable to maintain optimum WFR in the diesel engine 10 under any engine load. This can be achieved by varying the amount of injected water in accordance with two signals: one from an engine RPM sensor 14 and one from a gas pedal (throttle/rack) position sensor 15. Water injection is initiated only when the signals from both the engine RPM sensor 14 and the gas pedal position sensor 15 have reached a predetermined level. Preferably, these predetermined signals correspond to about 20% of full gas pedal movement and 120% of engine idle RPM. Any changes in engine RPM will affect the frequency of the oscillating pump 5 while any changes in throttle position will affect the width of electrical impulses relayed to the oscillating pump 5. The combination of these two signals assures a constant WFR at a predetermined level for a full range of engine power when WIS is operational. The WFR is regulated by electrical impulses driving the oscillating pump 5.

An electronic control block 13 initially acts on a signal from an engine coolant sensor 16. The electronic control block 13 operates on electricity supplied by a vehicle battery 17. When the engine warms up and reaches its normal operating temperature, the engine coolant sensor 16 sends a signal to the electronic control block 13 to begin generating alternating current (AC) signals of varying frequency and pulse width, delivered through cable 9 to oscillating pump 5. These AC signals control the oscillating pump 5. In the preferred embodiment, the frequency of the AC signals is equal to engine RPM, which is detected by the engine RPM sensor 14. The pulse width of the AC signals is proportional to gas pedal position, which is sensed by the gas pedal position sensor 15. Such an arrangement provides a fast and precise water injection system response. This ensures that the quantity of injected water is directly proportional to the engine RPM and gas pedal depression (i.e. directly proportional to the amount of injected fuel) and thus a constant WFR is maintained at any engine load. Preferably, information from the electronic block 13 is sent by a cable 23 to a dashboard (not shown) mounted in the operator's cabin.

Further embodiments can incorporate the modulation of the frequency and pulse width of the AC signals driving the oscillating pump 5 in accordance with the following engine parameters:

The water injection rate can be dependent on the amount of injected fuel with adjustments made to take into account factors such as intake air temperature and humidity.

The water injection rate can be dependent on the rate of intake airflow. Two standard means to measure and calculate intake airflow can be incorporated: a) by signals from manifold absolute pressure, intake air temperature, and RPM sensors; or b) by signal from a mass air flow sensor. Further corrections for intake air temperature and humidity could be incorporated.

The water injection management may be in a closed-loop operation, dependent on engine parameters such as exhaust gas temperature, exhaust gas NOx concentration, compressed air temperature after the intercooler, and compressed air pressure.

In the preferred embodiment, any water being injected by the atomizing nozzles 7 into the first compressed air duct 26 and/or the second compressed air duct 27 is preheated in order to speed up the rate of injected water evaporation. The water exiting the oscillating pump 5 is heated in a heat exchanger 28 using hot engine coolant. The heat exchanger 28 is preferably of simple construction. In the preferred embodiment, the heat exchanger 28 is a copper pipe tightly wrapped around a portion of the high-pressure pipes 6. The copper pipe is looped by flexible rubber pipes into the engine cooling system. The controlled temperature of engine coolant (around 90° C.) assures heating of the injected water to a temperature of about 70–75° C. The use of other heat sources, such as an electrical heater, is also possible.

The presence of water vapour and water droplets in the first compressed air duct 26 effectively prevents any oily deposits to form on the inner surfaces of the air intercooler 9. This keeps the pressure drop over the air intercooler 9 at a minimum and thus supplies the maximum amount of cool air to the combustion chamber of diesel engine 10. A clean intercooler contributes to operational fuel savings and reduced engine wear. Due to the high temperature of the compressed air entering the air intercooler 9, most of the injected water evaporates instantly, which allows for a high rate of water delivery to the combustion chamber.

The second compressed air duct 27 is provided with an automatically controlled water drain 12. The water drain 12 automatically opens when an excessive amount of precipitated water accumulates in the second compressed air duct 27. The water drain 12 also automatically opens when the diesel engine 10 is shut off. The water drain 12 can be a solenoid valve or any other suitable valve.

In order to use potable water for water injection instead of distilled water, a replaceable deionizing filter 22 is provided in the preferred embodiment. The replaceable deionizing filter 22 produces deionized water by removing dissolved salts. The replaceable deionizing filter 22 can be a single-stage, mixed bed, cation/anion ion exchange color-exhausting cartridge housed in a translucent flexible housing. A water conductivity meter 33 measures the electrical conductivity of treated water, directly co-related to the concentration of dissolved salts in the water. If the conductivity exceeds an allowed predetermined level, an appropriate signal is sent.

The water source 1 is equipped with a heating element (not shown) and a thermostat 24 that is connected to the vehicle battery 17. The heating element and the thermostat 24 is always in the "switch on" position; however, it starts to work only when the water temperature within the water source 1 becomes lower than a preset level, usually 5–6° C. When the water temperature in the water source 1 drops below the preset level, the heating element and the thermostat 24 will begin to heat the water, hence preventing water in the water source 1 from freezing. The fine mesh particulate filter 33 is preferably disposed inside the water source 1, and the ion exchange deionizer cartridge 22 is preferably attached to the outer wall of the water source 1 and shares a common thermal insulation wrapping. The vehicle battery 17 is preferably equipped with a run down protection circuit to prevent the total discharge of the battery. The elements of the system that could sustain irreversible damage if the water froze are the water flow meter 4 and the oscillating pump 5. To prevent this, an air pipe 18 controlled by a solenoid valve 19 is provided to supply compressed air to the intake port of the water flow meter 4. Before the diesel engine 10 is shut off, the electronic control block 13 sends a signal through a wire 20, opening the solenoid valve 19 to admit air into the system. In a matter of seconds, all water is purged from the water flow meter 4 and the oscillating pump 5, and the diesel engine 10 is ready to be shut off.

The pollution-reduction benefits of the present invention are dependent on the availability of water in the water source 1. If the water source 1 becomes empty and water is not added to it, the diesel engine 10 will generate a high level of emissions. Therefore, in the preferred embodiment, a low water sensor 35 is provided that connects to a warning indicator 36 that generates a visible or audible signal to the operator when the water level in the water source 1 drops below a certain level. Similarly, a timer 37 is connected to the warning indicator 36 such that after a certain period of time has elapsed after activation of the warning indicator 36, the timer 37 will cause the engine to shut down, forcing the operator to refill the water source 1.

The water flow meter 4 can be used as a diagnostic device. If the oscillating pump 5 malfunctions or the atomizing nozzles 7 become clogged, the water flow meter 4 will detect a water flow less than a predetermined minimum level and will send an appropriate signal to the electronic control block 13 via a cable 21. The electronic control block 13 will then shut off the water injection system. The water flow meter 4 preferably comprises a floating magnetic ball in a conical tube with an adjustable sensor for low water flow detection. When the water flow drops below a predetermined level, the magnetic ball in the water flow meter 4 drops in the conical tube and activates a relay, causing a signal to be sent to the electronic control block 13.

The control of the water injection rate in the present invention operates as follows.

After start-up of the system, the electronic control block 13 receives a signal from the engine coolant sensor 16. The electronic control block 13 energizes the water injection system only when the engine has completely warmed up. When the engine has warmed up, the water injection system is ready to operate. The electronic control block 13 simultaneously and permanently receives in parallel two electrical signals—one from the engine RPM sensor 14 and one from the gas pedal position sensor 15. When both signals reach a predetermined level, the electronic control block 13 begins to generate a driving signal to the oscillating pump 5. In the preferred embodiment, the rotational speed of the diesel engine 10 varies between 900 RPM at idle to 3300 RPM at red line, which corresponds to a frequency range of 15–55 Hz for the generated driving signal. In the preferred embodiment, the oscillating pump 5 has its peak productivity at 50–60 Hz; therefore, the electronic control block 13 is designed to generate one rectangular impulse of 24 V per one crankshaft revolution. As a result, the oscillating pump 5 is working in a comfortable frequency interval of 18–55 Hz. The width of the impulse is proportional to the gas pedal depression. The time interval of the pulse width is maintained between the oscillating pump 5's valves' dead time (or 3 milliseconds) and half time of the full crankshaft rotation on maximum engine rotational speed (or 9 milliseconds). The pulse width is therefore maintained between 3 and 9 milliseconds corresponding to between 20% and 100% of gas pedal depression. When the engine is accelerating, both the engine RPM sensor 14 and the gas pedal position sensor 15 send corresponding signals to the electronic control block 13, which in return modulates the frequency and pulse width to the oscillating pump 5. The oscillating pump 5 increases or decreases the water flow to the atomizing nozzles 7 proportionally to fuel flow. When the diesel engine 10 experiences sharp deceleration, the engine RPM is still high, but the gas pedal is fully extracted. The signal from the gas pedal position sensor 15 drops below a threshold level and water injection stops immediately. At idle, the water injection system does not operate and is kept in a stand-by position. When water injection is stopped, the oscillating pump 5 does not receive driving signals from the electronic control block 13, thus conserving electricity and extending the oscillating pump 5's useful lifespan.

In the present invention, all components are of relatively small dimensions. The oscillating pump is approximately 5 cm×5 cm×4.5 cm; the control block is approximately 10 cm×8 cm×4 cm. All parts, including the control block, the oscillating pump, the solenoids, the water injectors, and the filters, are easily located under a vehicle's hood or inside a bus engine's compartment. A water tank of 20–50 litre capacity can be easily located anywhere on the vehicle's body.

TESTS

Tests of various embodiments of the present invention were performed at test-bed facilities. The controlled test program was conducted on two types of heavy-duty engines with the intent of demonstrating the performance of the water injection system technology.

One engine was a 1995 Caterpillar 3406E engine with an electronically controlled fuel injection system and the second engine was a Cummins NTC-350 engine with a mechanically controlled fuel injection system. A program was arranged with two test engine configurations—one as the baseline and the other with the water injection system in operation. The evaluation was comprised of a series of simulation protocol emission tests, which started with one baseline test followed by a number of consecutive water injection system device tests.

The general trend showed that the operation of the water injection system impacts practically all of the engines' parameters. FIGS. 4a, 4b, and 4c illustrate the results of the tests. With the water injection system in operation, the test results showed that the mass emission of NOx was reduced up to 33.5% for both engines with maximum water flow of 0.39/L/min (WFR=40%). This improvement was observed when the water injection rate was increased from 0.0 L/min up to 0.39 L/min and the NOx mass was compared to the initial baseline test data without water injection. Particulate mass also reduced from 2% to 8.4% for these same test runs. Exhaust gas temperature was reduced by 26° C. for the Caterpillar engine and around 20° C. for the Cummins engine with water injection at 0.39 litters/min, though in these tests, the impact was found to lessen as the water injection rate increased. The fuel consumption record shows a reduction of as much as 0.5% for Caterpillar engine and 2.0% for the Cummins engine under optimum water/fuel ratio of approximately 20%. It is very important to notice that water injection did not affect engine power (the fluctuation of engine power was between +/−0.1%). All these results are in compliance with the theoretical calculation presented in FIG. 3.

Based on these tests the following proven technology benefit can be formulated:

Environmental Benefits:
NOx emissions reduction of up to 35%
Particulate emissions (PM) reduction of up to 10%.
Operational Benefits:
Reduced exhaust temperature. Because of this fact, the maintenance cost associated with frequent replacement of parts such as exhaust valves, turbine wheels, and pistons is lower with the present invention.
Continuous water flow eliminates substantially all deposits from the air cooler, scavenging manifold, and suction valves, maintaining them in clean condition. This results in two advantages: 1) Increased overhaul period; and 2) Fuel savings (about 3% less fuel consumption).

WIS is practically maintenance free: only a periodical change of the ion exchange water deionizing filter (approximately once every two months) is required.

No additional space for WIS installation is required.
No engine modification is required.
The system is of low cost.

It will be apparent to those skilled in the art that other modifications and variations can be made to the water injection system of the present invention and in the construction of a water injection system without departing from the scope and spirit of the invention.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A water injection system for a turbocharged diesel engine comprising:
    a compressed air source configured to produce compressed air for delivery to the air intake manifold of said diesel engine;
    an aircooler configured to cool said compressed air;
    an oscillating pump for supplying pressurized water to said compressed air prior to delivery of said compressed air to air intake manifold of said diesel engine, wherein the amount of said pressurized water supplied is dependent on the frequency and pulse width modulation of electric driving signals supplied to said oscillating pump; and
    one or more electronic control devices for generating electric driving signals to said oscillating pump.

2. The water injection system of claim 1, further comprising one or more atomizing nozzles configured to inject water from said oscillating pump into said compressed air either before or after, or before and after said aircooler.

3. The water injection system of claim 2, further comprising:
    a first compressed air duct connecting said compressed air source to said aircooler; and
    a second compressed air duct connecting said aircooler to said air intake manifold of said diesel engine, wherein said atomizing nozzles inject water into said compressed air ducts simultaneously.

4. The water injection system of claim 3, further comprising a water drain trap in said second compressed air duct wherein said water drain trap automatically opens when excess water accumulates in said second compressed air duct.

5. The water injection system of claim 4, wherein said water drain trap is normally held open when said diesel engine is shut off.

6. The water injection system of claim 2, wherein said atomizing nozzles are configured to inject water into said first compressed air duct in a direction generally opposite to the direction of flow of compressed air in said first compressed air duct.

7. The water injection system of claim 2, further comprising a water flow meter connected before said oscillating pump to measure water quantity supplied by said oscillating pump to said atomizing nozzles.

8. The water injection system of claim 7, further comprising an electrical connection between said water flow meter and said one or more electronic control devices, wherein said one or more electronic control devices disable said oscillating pump when water flow as measured by said water flow meter falls below a predetermined minimum level.

9. The water injection system of claim 1, further comprising:
    a heat exchanger for heating water supplied by said oscillating pump to between 75–85° C. prior to injection to compressed air.

10. The water injection system of claim 9, wherein said heat exchanger uses heat from engine coolant of said diesel engine to heat water.

11. The water injection system of claim 1, wherein the frequency of the electric driving signals supplied to said oscillating pump is proportional to rotational speed of said diesel engine and the pulse width of the electric driving signals supplied to said oscillating pump is proportional to the depression of the throttle of said diesel engine.

12. The water injection system of claim 1, further comprising:
    a water source to supply water to said oscillating pump; and
    a heat source applied to said water source such that water within said water source is heated to a preset temperature level to prevent water from freezing.

13. The water injection system of claim 12, wherein said heat source is an electric heater.

14. The water injection system of claim 1, further comprising a water source to supply water to said oscillating pump, wherein said water source comprises a level sensor and said level sensor detects when water level in said water source falls below a predetermined minimum level.

15. The water injection system of claim 14, further comprising a timer connected to said level sensor and an engine kill circuit connected to said timer, wherein said timer causes said engine kill circuit to disable said diesel engine after a predetermined period of time has elapsed since said level sensor detects water level in said water source falling below the predetermined minimum level.

16. The water injection system of claim 14, further comprising a flexible hose connecting air intake manifold of said diesel engine to said water source.

17. The water injection system of claim 1, wherein said one or more electronic control devices are active only when said diesel engine reaches normal operating temperature.

18. The water injection system of claim 1, wherein the frequency and the pulse width of the electric driving signals supplied to said oscillating pump is proportional to the rate of intake inflow of said diesel engine and to the rotational speed of said compressed air source.

19. A water injection system for a turbocharged diesel engine comprising:
- a compressed air source to produce compressed air for delivery to the air intake of said diesel engine;
- a water source;
- one or more atomizing nozzles configured to inject water into the compressed air produced by said compressed air source;
- an oscillating pump for supplying pressurized water from said water source to said atomizing nozzles, wherein the amount of pressurized water supplied is dependent on the frequency and pulse width modulation of electric driving signals supplied to said oscillating pump;
- a plurality of sensors for detecting engine running parameters of said diesel engine;
- an electronic control block for monitoring engine running parameters from said sensors and for generating electric driving signals to said oscillating pump; and
- an ion exchange water deionizing filter located after said water source and before said oscillating pump.

20. The water injection system of claim 19, further comprising a water conductivity meter connected after said ion exchange water deionizing filter and before said oscillating pump, wherein said water conductivity meter measures the conductivity of water.

21. The water injection system of claim 20, further comprising an alarm connected to said water conductivity meter, wherein said water conductivity meter causes alarm to activate when conductivity of water exceeds a predetermined maximum allowable level.

22. A method for controlling the amount of water injected into the air intake of a turbocharged diesel engine, comprising the steps of:
- detecting the rotational speed of said diesel engine;
- detecting the depression of the throttle of said diesel engine;
- detecting the operating engine temperature of said diesel engine;
- generating electric driving signals for an oscillating pump when the rotational speed, the depression of the throttle, and the operating engine temperature reaches a predetermined level, wherein the frequency of the electric driving signals is proportional to the rotational speed and the pulse width of the electric driving signals is proportional to the depression of the throttle; and
- transmitting the electric driving signals to an oscillating pump to control the amount of water pumped from a water source to one or more atomizing nozzles configured to inject water into the compressed air produced by a compressed air source prior to delivery of said compressed air to the air intake manifold of said diesel engine.

* * * * *